(12) United States Patent
Jarvstrom et al.

(10) Patent No.: US 10,814,399 B2
(45) Date of Patent: Oct. 27, 2020

(54) METHOD OF GRINDING A PARTING/GROOVING INSERT AND A PARTING/GROOVING INSERT

(71) Applicant: SANDVIK INTELECTUAL PROPERTY AB, Sandviken (SE)

(72) Inventors: Tobias Jarvstrom, Gimo (SE); Henrik Imrell, Osthammar (SE)

(73) Assignee: Sandvik Intellectual Property AB, Sandviken (SE)

( * ) Notice: Subject to any disclaimer, the term of this patent is extended or adjusted under 35 U.S.C. 154(b) by 58 days.

(21) Appl. No.: 15/528,859

(22) PCT Filed: Nov. 6, 2015

(86) PCT No.: PCT/EP2015/075936
§ 371 (c)(1),
(2) Date: May 23, 2017

(87) PCT Pub. No.: WO2016/083098
PCT Pub. Date: Jun. 2, 2016

(65) Prior Publication Data
US 2017/0312828 A1 Nov. 2, 2017

(30) Foreign Application Priority Data

Nov. 24, 2014 (EP) ..................................... 14194433

(51) Int. Cl.
*B23B 27/14* (2006.01)
*B23B 27/04* (2006.01)
(Continued)

(52) U.S. Cl.
CPC .............. *B23B 27/045* (2013.01); *B24B 3/08* (2013.01); *B24B 3/34* (2013.01); *B23B 27/005* (2013.01);
(Continued)

(58) Field of Classification Search
CPC ..... Y10T 407/26; Y10T 407/27; B23B 27/14; B23B 27/141; B23B 27/148; B23B 27/18;
(Continued)

(56) References Cited

U.S. PATENT DOCUMENTS

| 4,629,372 A * | 12/1986 | Huston | ................... | B23B 27/08 |
| | | | | 407/116 |
| 5,056,963 A * | 10/1991 | Kameno | ............... | B23B 27/145 |
| | | | | 29/90.01 |

(Continued)

FOREIGN PATENT DOCUMENTS

| DE | 102006035845 A1 | 2/2008 |
| EP | 0057625 A2 * | 8/1982 | ........... B23B 27/143 |

(Continued)

Primary Examiner — Nicole N Ramos
(74) Attorney, Agent, or Firm — Corinne R. Gorski

(57) ABSTRACT

A parting/grooving insert and a method of grinding a parting/grooving insert including rotating a plane grinding surface having a normal vector parallel to the axis of rotation and a tangential direction of rotation; providing a parting/grooving insert including a rake surface, a main clearance surface, and a main cutting edge formed between the rake and main clearance surfaces; orienting/positioning the insert relative to the grinding surface, such that the main clearance surface is parallel to the grinding surface, the normal vector of the main cutting edge being in the plane of the main clearance surface and with a vector component in the direction of rotation forming an angle to the tangential direction of rotation at the insert of at least 20 degrees from parallel orientation; and grinding the main clearance surface to provide grinding marks having an angle to the normal vector of the main cutting edge corresponding to the angle to the tangential direction of rotation.

7 Claims, 4 Drawing Sheets

(51) Int. Cl.
  *B24B 3/08*  (2006.01)
  *B24B 3/34*  (2006.01)
  *B23B 27/00* (2006.01)

(52) U.S. Cl.
  CPC ......... *B23B 27/14* (2013.01); *B23B 2200/128* (2013.01)

(58) Field of Classification Search
  CPC ........... B23B 27/045; B24B 3/08; B24B 3/34; B24D 7/00
  See application file for complete search history.

(56) References Cited

U.S. PATENT DOCUMENTS

| | | | |
|---|---|---|---|
| 5,059,068 A | 10/1991 | Scott | |
| 5,178,645 A * | 1/1993 | Nakamura | B23B 27/145 407/119 |
| 5,221,164 A * | 6/1993 | Allaire | B23C 5/207 407/113 |
| 5,423,639 A * | 6/1995 | Wiman | B23B 27/045 407/116 |
| 5,676,495 A * | 10/1997 | Katbi | B23B 27/045 407/114 |
| 5,868,531 A * | 2/1999 | Sandford | B23B 27/16 407/114 |
| 5,919,008 A * | 7/1999 | Shimomura | B23C 3/06 407/35 |
| 5,944,587 A * | 8/1999 | Stadtfeld | B24B 3/00 451/48 |
| 5,947,649 A * | 9/1999 | Arai | B23C 5/109 407/34 |
| 6,161,990 A * | 12/2000 | Oles | B23B 27/145 407/113 |
| 6,171,031 B1 * | 1/2001 | LaFlamme | B23B 27/141 407/113 |
| 6,264,531 B1 | 7/2001 | Bailer et al. | |
| 6,315,502 B1 * | 11/2001 | Maurer | B23B 27/141 407/118 |
| 6,379,218 B1 | 4/2002 | Bailer et al. | |
| 6,428,247 B1 * | 8/2002 | Friedman | B23B 27/045 407/110 |
| 6,524,036 B1 * | 2/2003 | Kolker | B23B 27/143 409/131 |
| D537,854 S * | 3/2007 | Tong | D15/139 |
| 7,419,336 B2 * | 9/2008 | Lehto | B23C 5/1045 407/113 |
| 2002/0122700 A1 * | 9/2002 | Inayama | B23B 27/045 407/117 |
| 2002/0131832 A1 * | 9/2002 | Morsch | B23B 27/045 407/118 |
| 2003/0156909 A1 * | 8/2003 | Tong | B23B 27/045 407/117 |
| 2009/0092453 A1 * | 4/2009 | Jonsson | B23B 27/045 407/108 |
| 2012/0230785 A1 * | 9/2012 | Chen | B23B 27/141 407/114 |
| 2013/0183109 A1 | 7/2013 | Fujii | |
| 2015/0043981 A1 * | 2/2015 | Nagami | B23C 5/06 407/113 |
| 2015/0239050 A1 * | 8/2015 | Hirano | B23B 27/141 407/115 |
| 2015/0321262 A1 * | 11/2015 | Kondameedi | B23B 27/005 407/115 |

FOREIGN PATENT DOCUMENTS

| | | |
|---|---|---|
| EP | 0343983 A2 | 11/1989 |
| EP | 0365299 A2 | 4/1990 |
| EP | 2578340 A1 | 4/2013 |
| JP | S6080519 A | 5/1985 |
| JP | H498556 U | 8/1992 |
| JP | 2006272509 A | 10/2006 |
| JP | 2013193134 | 9/2013 |
| WO | 95/01239 A1 | 1/1995 |

* cited by examiner

METHOD OF GRINDING A PARTING/GROOVING INSERT AND A PARTING/GROOVING INSERT

RELATED APPLICATION DATA

This application is a § 371 National Stage Application of PCT International Application No. PCT/EP2015/075936 filed Nov. 6, 2015 claiming priority of EP Application No. 14194433.0, filed Nov. 24, 2014.

TECHNICAL FIELD

The invention relates generally to a method of grinding a parting/grooving insert, a parting/grooving insert and a slot milling disc.

BACKGROUND ART

Parting/grooving inserts may be used in turning applications where there is a need for grooves to be made in the work piece, or for cutting off one part of the work piece from another. They may also be used in slot milling applications, for milling slots or grooves by a rotating slot mill.

Such a parting/grooving insert comprises a rake surface, a main clearance surface, and a main cutting edge formed between the rake surface and the main clearance surface. The parting/grooving insert comprises a left and a right side clearance surface, wherein the cutting edge comprises a left side cutting edge formed between the rake surface and the left side clearance surface, and a right side cutting edge formed between the rake surface and the right side clearance surface.

During fabrication of such parting/grooving inserts the clearance surfaces are grinded to provide a sharp cutting edge. In FIG. 1 a grinding method used in prior art is illustrated. A grinding surface is provided on an outer curved radial surface of a grinding wheel, and the main clearance surface is grinded by placing the insert towards this radially outer curved grinding surface and the parting/grooving insert is moved up and down relative to the curved grinding surface to obtain a flat or plane main clearance surface and a straight main cutting edge. Thereafter the parting/grooving insert is oriented and positioned in relation to the grinding wheel to be able to grind the left and/or right side clearance surface.

However there is a need to improve the method of grinding the parting/grooving insert. More precisely by improving the flatness of the clearance surface, in particular the main clearance surface, as well as the quality of the cutting edge and to shorten processing times.

SUMMARY OF INVENTION

An object of the present invention is to provide an improved method of grinding a parting/grooving insert. In particular it is sought to provide a grinding method which improves the flatness of the clearance surfaces, as well as the quality of the cutting edge and which may be used to shorten processing times in the process of grinding the parting/grooving insert.

Thus the invention relates to a method of grinding a parting/grooving insert by rotating a grinding wheel including a plane grinding surface, having a normal vector parallel to the axis of rotation and a tangential direction of rotation in the grinding surface plane, providing a parting/grooving insert comprising a rake surface, a main clearance surface, and a main cutting edge formed between the rake surface and the main clearance surface, orienting and positioning the parting/grooving insert relative to the grinding surface such that the main clearance surface is parallel to the plane grinding surface, and such that a normal vector of the main cutting edge, as seen in the plane of the main clearance surface and in the direction of rotation, forms an angle to the tangential direction of rotation at the position of the parting/grooving insert, the angle being at least 20 degrees from parallel orientation, and grinding the main clearance surface, thus obtaining grinding marks having an angle to the normal vector of the main cutting edge corresponding to the angle to the tangential direction of rotation.

By means of the method, a parting/grooving insert is provided with a planar main clearance surface and a high cutting edge quality. In terms of edge quality it is not only important to obtain the right/desired macro-geometrical shape on the main cutting edge, which in this case means that the main cutting edge should be as straight as possible, but also to obtain the right/desired micro-geometrical shape by achieving the right/desired size on edge rounding or so called ER on the main cutting edge. The grinding method provides an efficient way of obtaining both a straight main cutting edge and on a microscopic level a desired main cutting edge rounding. When grinding the right size of edge rounding, in particular when grinding a relatively small edge rounding or sharp cutting edge, it's important to avoid small microscopic defects, such as small chippings of the cutting edge. The grinding method in accordance with the invention provides longer engagement between the main clearance surface and plane grinding surface making it possible to reduce the grinding pressure applied to the main clearance surface. This also reduces the pressure on the main cutting edge and the tendency of chipping the main cutting edge. Higher edge quality is hereby achieved, which improves both the cutting performance/machining result and the life time of the insert. Also the processing time of the grinding process may be shortened, because the insert can remain in one position in relation to the grinding wheel (e.g. there is no need to move the insert up and down to grind a flat clearance surface and straight cutting edge) and also due to shorter travelling distance when grinding several clearance surfaces and cutting edges of the parting/grooving insert, on the same plane grinding surface. Hence, the insert can remain in a specific position in relation to the grinding wheel and when the main clearance surface and main cutting edge has been grinded the insert can be turned into an orientation in which the right or left side clearance surface is in parallel with the plane grinding surface. The method is not however limited to an initial grinding of the main clearance surface, as the grinding may be initiated on a left or right side clearance surface, where after the insert may be turned into an orientation towards a subsequent grinding of the main clearance surface. It may be expedient to grind the left side clearance surface on one side of the grinding wheel and the right side clearance side on a mirror-symmetric opposite side of the grinding wheel (which is further described below). Yet only one such positional change is needed to grind all the clearance surfaces and cutting edges of the parting/grooving insert, which reduces the processing time in comparison with grinding in several different positions in relation to the grinding wheel. The travelling distance between mirror-symmetric positions on the grinding wheel is also relatively short in comparison with the travelling distance between for instance diametrical opposite sides of the grinding wheel. It may further be noted that a relative small sized diameter grinding wheel can be used in the grinding method according to the invention to reduce such travelling distance.

The angle to the tangential direction of rotation may be at least 30 degrees from a parallel orientation.

Thus further improvements of the edge quality and processing time of the grinding process may be obtained.

The angle to the tangential direction of rotation may be less than 70 degrees from a parallel orientation.

Thus the parting/grooving insert is provided with grinding marks which are angled at least 20 degrees from parallel orientation with the cutting edge, which improves the edge quality of the cutting edge to provide a desirable edge rounding on a microscopic level.

The tangential direction of rotation may be less than 60 degrees from a parallel orientation.

The parting/grooving insert may further comprise a left and a right side clearance surface and wherein the cutting edge comprises a left side cutting edge formed between the rake surface and the left side clearance surface, and a right side cutting edge formed between the rake surface and the right side clearance surface, and for each respective clearance surface, orienting and positioning the parting/grooving insert relative to the grinding surface such that the respective clearance surface is parallel to the grinding surface, and such that the normal vector has an angle to the tangential direction of rotation at the position of the parting/grooving insert the angle being at least 20 degrees from parallel orientation. As mentioned above, the grinding method is not limited an initial grinding of the main clearance surface followed by the grinding of the side clearance surfaces. Hence, the grinding method may be initiated with a grinding of any of the right and left side clearance surfaces followed by a grinding of the main clearance surface.

The left and right side clearance surfaces may also be grinded by tilting the parting/grooving insert from the position of grinding the main clearance surface, minimizing the movement of the parting/grooving insert between the grinding positions and thus shortening the processing time of grinding the insert.

The parting/grooving insert may comprise a left hand corner radius surface between the main clearance surface and the left side clearance surface, and a right hand corner radius surface between the main clearance surface and the right side clearance surface, and wherein the parting/grooving insert is gradually moved between the position of grinding the left side clearance surface and the main clearance surface thus grinding the left hand corner radius surface, and/or wherein the parting/grooving insert is gradually moved between the position of grinding the right side clearance surface and the main clearance surface thus grinding the right hand corner radius surface.

Thus the corner radius surface may be machined during the step of tilting the parting/grooving insert between the position of grinding the main clearance surface and the respective left and right side clearance surfaces, thus shortening the processing time of grinding the insert.

The invention further relates to a parting/grooving insert comprising a rake surface and a main clearance surface, and a main cutting edge formed between the rake surface and the main clearance surface, wherein the main cutting edge has a normal vector in the plane of the main clearance surface, and wherein the main clearance surface comprises grinding marks having an orientation of at least 20 degrees to the normal vector of the main cutting edge.

Thus a parting/grooving insert is provided which may be processed by the method as disclosed herein and with a planar main clearance surface having a good edge quality due to the grinding marks which on a microscopic level provides a desirable edge rounding.

The grinding marks may have an orientation of at least 30 degrees to the normal vector of the main cutting edge. The grinding marks may have an orientation of less than 70 degrees, or less than 60 degrees, to the normal vector of the main cutting edge.

The parting/grooving insert may further comprise a left and a right side clearance surfaces and wherein the cutting edge comprises a left side cutting edge formed between the rake surface and the left side clearance surface, and a right side cutting edge formed between the rake surface and the right side clearance surface, and wherein the respective left and right side clearance surface comprises grinding marks having an angle to the normal vector of at least 20 degrees.

The left and right side clearance surface may be formed on a shelf, protruding from the respective left and right side of the parting/grooving insert.

Thus the grinding of the respective left and right side clearance surface may be limited to only the side surface defined by the shelf, whereas remaining side surfaces of the parting/grooving insert remains unaffected by the grinding process. Thus a well-defined clearance surface is obtained.

A rearward extension of the shelf from the main clearance surface to an end of the shelf, and thus the left and right side clearance surfaces rearward extension may be greatest at the respective left and right side cutting edge and may decrease with increased distance below the respective left and right side cutting edge. The end of the shelf may hereby extend along a single straight and inclined line or several straight/inclined lines, or along a single curved line (e.g. an approximate quarter-circle), or several curved lines or any combination of straight and curved lines extending from a rear end of the left and right side cutting edge toward the main clearance surface.

Thus the shape of the left and right side clearance surface is suitable for grinding at a position and orientation of the parting/grooving insert wherein the respective left and right side cutting edge has a normal vector, in the plane of the respective clearance surface and with a vector component in the direction of rotation, and having an angle to the tangential direction of rotation at the position of the parting/grooving insert corresponding to the angle of the normal vector of the main cutting edge to the tangential direction of rotation.

An internal angle between the main clearance surface and the left side clearance surface as well as the main clearance surface and the right side clearance surface, respectively, may be sharper than 90 degrees, preferably in the range of 85-89 degrees.

Thus the parting/grooving insert is suitable for parting and grooving applications, minimizing risk of pinching of the insert in the groove being machined.

The cutting tool may be obtained by the method as disclosed herein.

The invention further relates to a slot milling disc having a centre axis, and comprising an outer peripheral surface provided with a number of cutting edges, a first side surface having a bearing surface around the centre axis, a second side surface opposite the first side surface, and attachment means adapted to interact with mating attachment means of a rotatable mounting shaft to allow rotary preventing attachment of the slot milling disc to the rotatable shaft and forcing of the bearing surface towards a mounting surface at an end surface of the shaft, wherein the number of cutting edges is provided in separate cutting inserts being formed as parting and/or grooving inserts as disclosed herein and being mounted in insert seats arranged at the peripheral surface of the milling disc.

Such slot milling discs or so called slot milling cutters are utilized to cut relatively deep, narrow and long slots or grooves, of a uniform width, in a work piece. The slot milling cutter can also be utilized for a cutting off or parting operation. The slot milling discs are in general flat with planar first and second side surfaces. The cutting edges of the disc are arranged on separate cutting inserts oriented perpendicular to the rotary plane of the milling disc and will typically have a width slightly larger than the width of the disc itself. The thickness of the slot milling disc may be in the range of 1.5-10 mm, and preferably 2-8 mm. The disc may be provided with attachment means for rotary preventing attachment of the slot milling disc to the rotatable shaft and pressing of the bearing surface towards an end surface of the shaft. The attachment means may comprise through holes in the disc and threaded holes in the end surface of the shaft, wherein screws are adapted to extend through the holes in the disc and be screwed into the threaded holes, as well as of a centre hub to be extended through a centre hole of the milling disc.

The invention further relates to a use of the parting/grooving insert as disclosed herein for turning or milling.

BRIEF DESCRIPTION OF DRAWINGS

The invention is now described, by way of example, with reference to the accompanying drawings, in which.

DESCRIPTION OF EMBODIMENTS

In the following, a detailed description of a method of grinding a parting/grooving insert and a parting/grooving insert according to various embodiments of the invention is presented.

Figure 1:
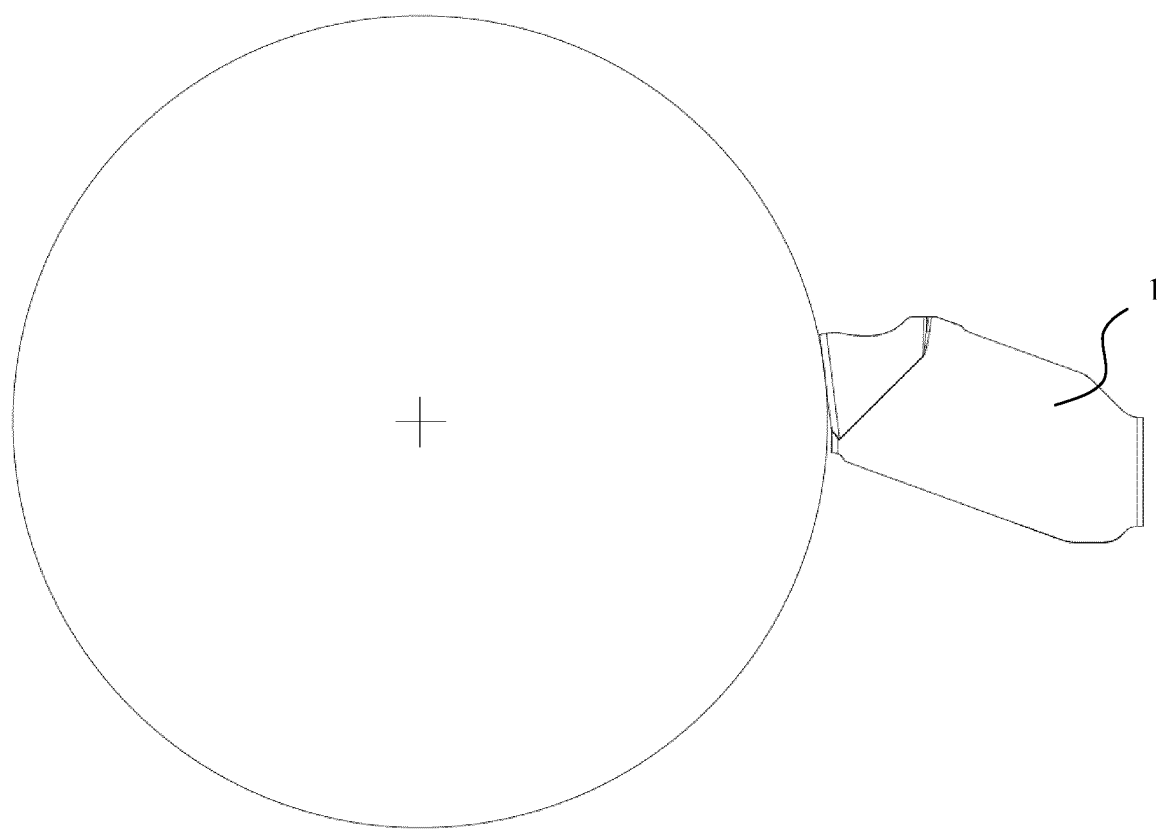
FIG. 1 shows grinding of a parting/grooving insert according to prior art.

First, in FIG. 1, a conventional method of grinding a parting/grooving insert 1 is illustrated. A grinding disc is provided, having a radially outer curved grinding surface around the circumference of the disc. The insert is brought towards this radially outer grinding surface to finish the main clearance surface of the insert. Thereby a main clearance surface is obtained having a slightly concave shape and provided with grinding marks extending straight from the lower portion of the surface to the upper portion of the clearance surface, at the cutting edge.

Figure 2:
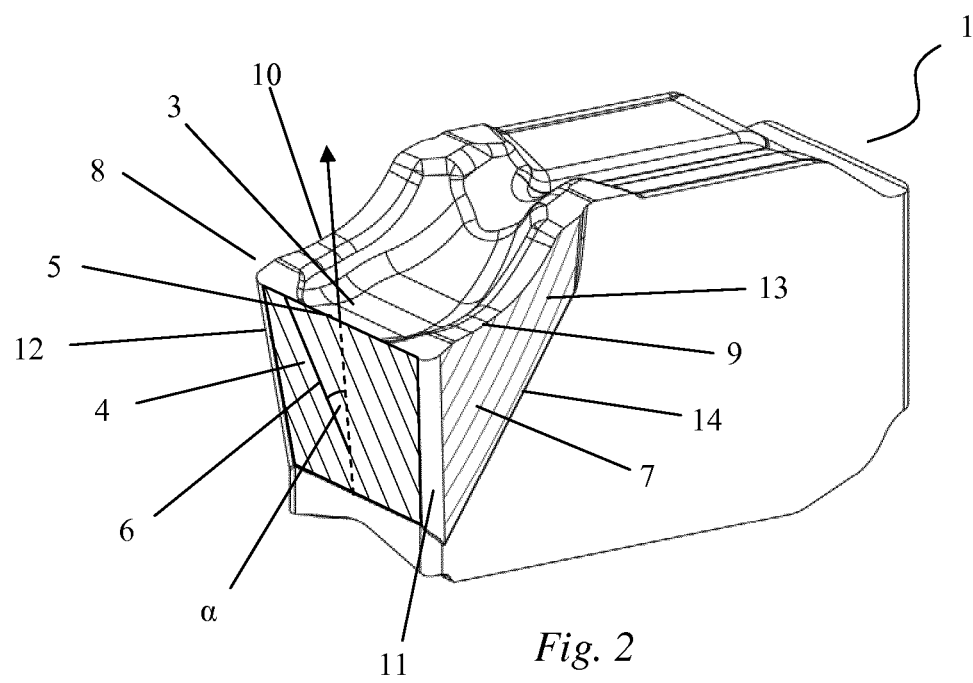
FIG. 2 shows a parting/grooving insert according to an embodiment of the present invention.

A parting/grooving insert according to an embodiment of the invention is shown in FIG. 2. The insert comprises a body of cemented carbide, or other hard/wear resistant material, such as high speed steel or ceramics. The insert comprises a rake surface 3 and a main clearance surface 4. Between the rake surface 3 and the main clearance surface 4 a main cutting edge 5 is formed. An insert according to the invention has a plane main clearance surface 4 obtained during grinding, which will be explained in detail below.

From the left and right hand sides of the body of the insert, a shelf 14 protrude to form a left and right side clearance surface 7 and 8, respectively (only the left side visible in FIG. 2). Between the left side clearance surface 7 and the rake surface 3, a left side cutting edge 9 is formed, and a right side cutting edge 10 is formed between the rake surface 3 and the right side clearance surface 8. The rearward extension of the shelf 14 from the main clearance surface 4 is greatest close to the respective left and right side cutting edge 9 and 10 and decreases with distance below the respective left and right side cutting edge. Thereby the width of the left and right side clearance surfaces 7 and 8, defined by the extension of the shelf, decreases when moving from the cutting edge and downwards. As will be seen later on the shape of the side clearance surfaces are relevant to the method of grinding of the insert.

Between the left and right side clearance surfaces 7 and 8 and the main clearance surface 4, a respective left and right corner radius surface 11 and 12 is formed. Each corner radius surface is formed as a rounded transition surface between the main clearance surface and the right/left clearance surface extending along the side of the insert. Between the corner radius surface and the rake surface a corner radius cutting edge is formed having a rounded shape.

A normal vector of the main cutting edge is defined as a vector which extends perpendicularly to the main cutting edge 5, and lies in the plane of the planar main clearance surface 4. Thus the normal vector of the main cutting edge may extend in the direction N shown in FIG. 2, or in the opposite direction.

The main clearance surface 4 is provided with grinding marks illustrated as lines 6, covering the surface. These grinding marks are slanted in respect to the normal vector as defined above. An angle α between the normal vector N and the grinding marks is at least 20 degrees. Preferably the angle is also less than 70 degrees and most preferably within the range of 30-60 degrees. The grinding marks are visible as scratches in the surface of the clearance face.

Also the left and right side clearance surfaces are provided with slanted grinding marks 13 (left side shown). Similarly the grinding marks on the left and right side clearance surfaces are angled to the normal vector N as defined for the main clearance surface. The grinding marks have an angle to the normal vector N of at least 20 degrees. The grinding marks are oriented such that they incline forwards when moving downward from the cutting edge along the sides of the clearance surfaces. Thus the grinding marks essentially follow the shape of the shelf 14 defining the respective left and right side clearance surface 7 and 8.

Figure 3:
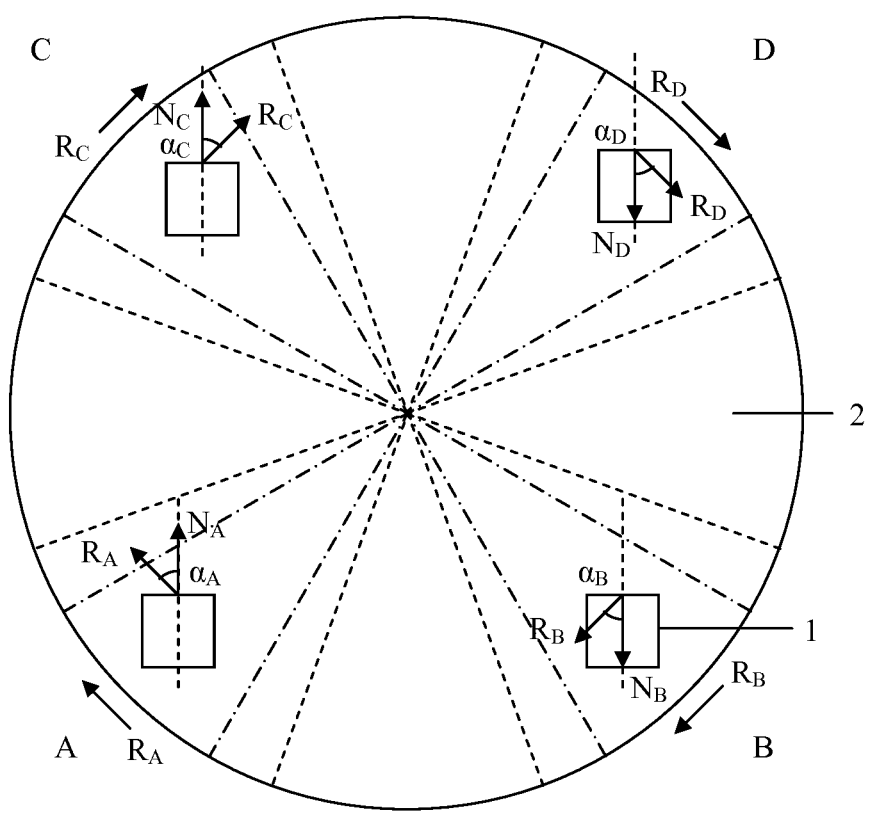
FIG. 3 shows positions of grinding the main clearance surface according to an embodiment of the present invention.

FIG. 3 illustrates a method of grinding the main clearance surface of a parting/grooving insert. A rotatable grinding wheel or disc having a plane grinding surface 2 is provided and rotated around a rotational axis X. A parting/grooving insert 1 is provided and oriented with the main clearance surface facing the grinding surface and being parallel to the plane grinding surface. A normal vector N of the main cutting edge is defined as above, situated in the plane of the main clearance surface 4 of the insert. The insert is positioned on the grinding surface such that the normal vector N of the main cutting edge, as seen in the plane of the main clearance surface and in the direction of rotation, at this position, forms an angle of at least 20 degrees to the tangential direction of rotation R, at the same position.

In FIG. 3, four sectors A, B, C and D on the grinding surface are illustrated which fulfill the requirement above.

Starting with sector A the main clearance surface 4 of the parting/grooving insert is illustrated as a square and the normal vector of the main cutting edge $N_A$ extends in the plane of the grinding surface. In the same point, the tangential direction of rotation is $R_A$. Between the normal vector $N_A$ and the tangential direction of rotation $R_A$ there is an angle $\alpha_A$. The normal vector is seen or oriented in the direction of rotation in this case (the angle $\alpha_A$ is sharper than 90 degrees). This does not necessarily mean that the insert must be turned upside-down in the grinding position. Instead the normal vector is defined in the direction of rotation to specify the specific angles α and sectors A, B, C and D on the grinding wheel, and irrespective of the insert rake surface facing the direction of rotation or facing away from the direction of rotation. The insert is positioned on the grinding surface such that the angle $\alpha_A$ is at least 20 degrees from parallel orientation. Preferably the angle $\alpha_A$ is also less than 70 degrees from parallel orientation. This range is indicated by the outer dotted lines (- - -) surrounding the sector A. Also a preferred range of $30<\alpha_A<60$ degrees is indicated by the inner dotted lines (- . - . -).

Also in sector B, C and D the requirements that the insert is positioned on the grinding surface such that the angle $\alpha_{B,\ C,\ and\ D}$ is at least 20 degrees from parallel orientation. In each case the normal vector shown ($N_B$, $N_C$, $N_D$) has a vector component in the direction of rotation in the respective position ($R_B$, $R_C$, $R_D$).

Thus by positioning the cutting insert in any of the indicated sectors A, B, C or D, grinding marks are obtained from the rotating grinding surface having an angle of at least 20 degrees from the normal vector defined for the clearance face.

Figure 4:
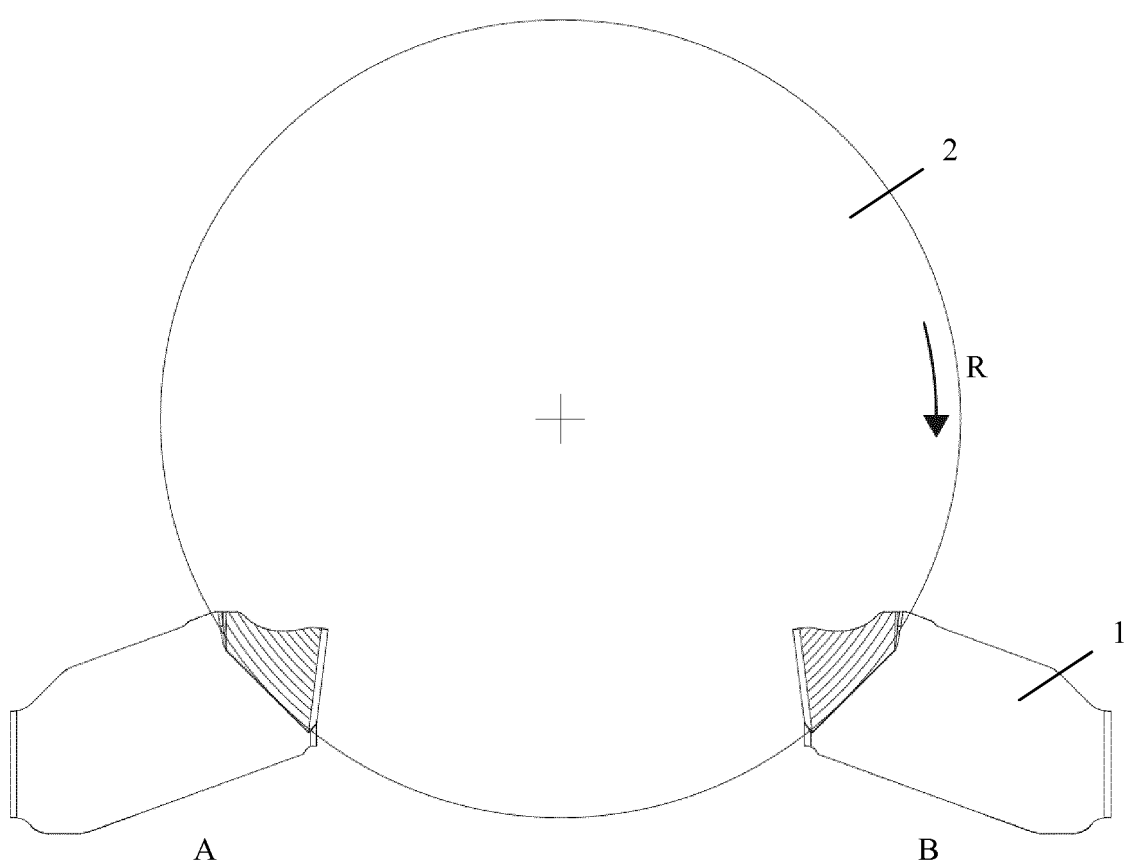
FIG. 4 shows positions of grinding the left and right side clearance surfaces according to an embodiment of the present invention.

In FIG. 4 the grinding of the left and right side clearance surfaces are shown. The left side clearance surface is grinded in position A and the right side clearance surface is grinded in position B. The shelf 14 on the respective side of the body of the cutting insert, defining the side clearance surfaces, is positioned close to the edge of the rotating grinding surface. Thus the edge of the rotating grinding surface follows the shape of the shelf.

Thus by positioning the sides of the parting/grooving insert in the indicated sectors A or B (or similarly C or D), slanted grinding marks are obtained from the rotating grinding surface having an angle of at least 20 degrees from the normal vector defined for the clearance face.

To grind both side clearance surfaces and the main clearance surface, the insert is moved between the positions indicated in FIG. 4 and one of the positions A or B indicated in FIG. 3. During moving the insert from the position of grinding a side clearance surface to grinding the main clearance surface, the corner radius region between these surfaces is grinded. The movement of the insert is decreased with respect to prior art and thus the throughput during the process of grinding parting/grooving inserts may be increased.

Figure 5:
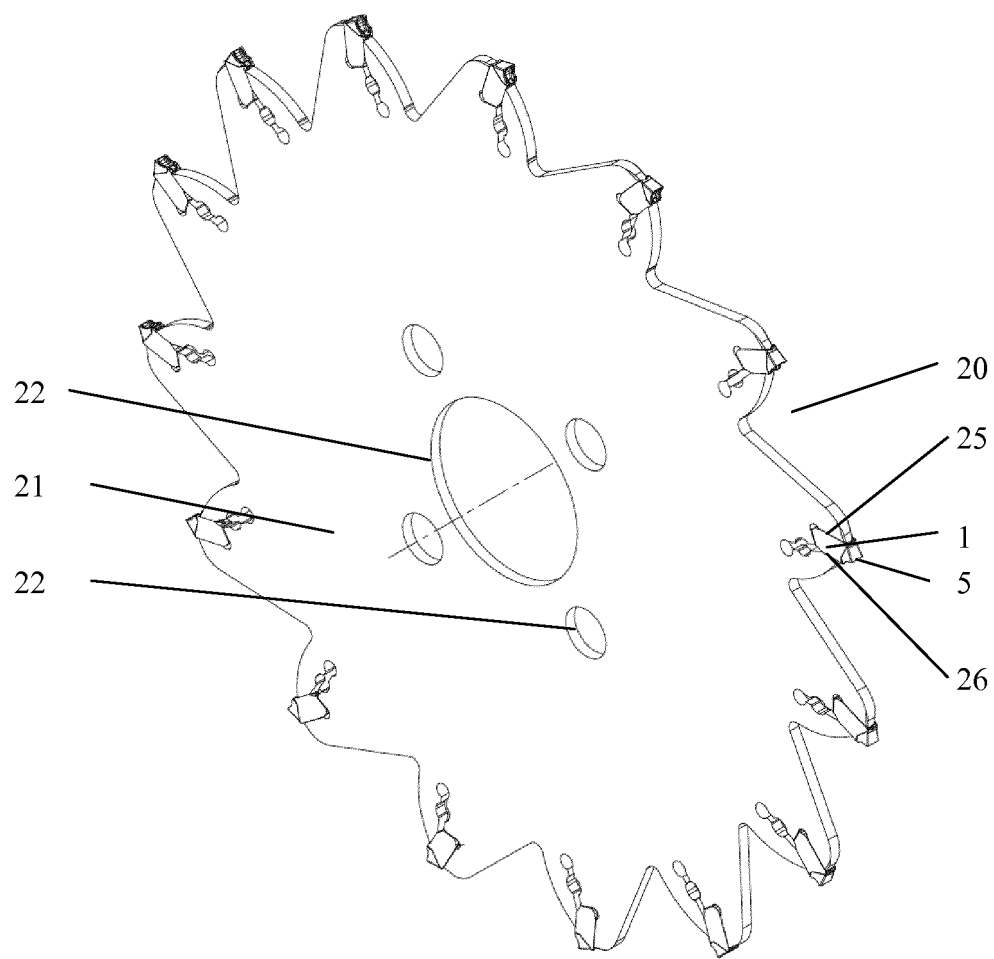
FIG. 5 shows a slot milling tool according to an embodiment of the present invention.

In FIG. 5 a slot milling disc is shown provided with a number of parting/grooving inserts as disclosed herein. The milling disc comprises a thin and flat disc body with a centre axis having a first side with a bearing surface adapted to bear against a mounting surface on the end surface of the shaft, and a second surface adapted to be facing away from the shaft in the mounted state. The disc has an overall circular shape with a sawtooth-like outer peripheral surface having a number of sawtooth-like projections. Each sawtooth-like projection is in the vicinity of its tip provided with a recess in which is mounted a cutting insert in the form of a parting and/or grooving insert, each having a cutting edge, used for cutting off or making grooves in a work piece. The insert is mounted in a seat with a clamping finger for securing it in the seat of the slot milling disc. These inserts are provided with a width of 1.5-10 mm, preferably 2-8 mm, and designed for cutting action in the feed direction. The cutting edge of the insert is however somewhat wider than the width of the slot milling disc in order to ensure clearance of the disc from the work piece in the slot during cutting. Such inserts may also be used for parting and/or grooving when turning. Between each two adjacent sawtooth-like projections is formed a concaveness which is utilized as a chip space in which cut chips are allowed to be formed/collected during cutting operation. The milling disc is also provided with a centre hole and attachment means in form of four screw holes distributed around the centre hole.

The invention claimed is:

1. A parting/grooving insert comprising:
a rake surface;
a left side clearance surface;
a right side clearance surface;
a main clearance surface having a plane;
a main cutting edge formed between the rake surface and the main clearance surface, wherein the main cutting edge has a normal vector in the plane of the main clearance surface, and wherein the main clearance surface includes grinding marks having an orientation of at least 20 degrees to the normal vector of the main cutting edge, wherein the grinding marks have an orientation of less than 70 degrees to the normal vector of the main cutting edge; and
a cutting edge including the main cutting edge, a left side cutting edge formed between the rake surface and the left side clearance surface, and a right side cutting edge formed between the rake surface and the right side clearance surface, the cutting edge being arranged to perform a parting/grooving operation, wherein the respective left and right side clearance surface each include grinding marks having an angle to the normal vector of at least 20 degrees.

2. The parting/grooving insert according to claim 1, wherein the grinding marks have an orientation of at least 30 degrees to the normal vector of the main cutting edge.

3. The parting/grooving insert according to claim 1, wherein the grinding marks have an orientation of less than 60 degrees to the normal vector of the main cutting edge.

4. The parting/grooving insert according to claim 1, wherein the left and right side clearance surfaces are formed in a shape of a shelf that protrudes from a respective left and right side of the insert.

5. The parting/grooving insert according to claim 4, wherein a rearward extension of the shelf from the main clearance surface, and thus the left and right side clearance surfaces, is greatest close to the respective left and right side cutting edge and wherein the rearward extension of the shelf decreases when moving in a direction downwards from the respective left and right cutting edges.

6. The parting/grooving insert according to claim 1, wherein an angle between the main clearance surface and the left side clearance surface and an angle between the main front clearance surface and the right side clearance surface is each is less than 90 degrees.

7. The parting/grooving insert according to claim 6, wherein an angle between the main clearance surface and the left side clearance surface and main front clearance surface and the right side clearance surface, respectively, is in the range of 85-89 degrees.

* * * * *